United States Patent
Corti

(10) Patent No.: US 10,226,151 B2
(45) Date of Patent: Mar. 12, 2019

(54) ESPRESSO AND FRESH-BREW COFFEE BREWING UNIT

(71) Applicant: N&W GLOBAL VENDING S.p.A., Valbrembo (IT)

(72) Inventor: Roberto Corti, Valbrembo (IT)

(73) Assignee: N&W GLOBAL VENDING S.p.A., Valbrembo (IT)

( * ) Notice: Subject to any disclaimer, the term of this patent is extended or adjusted under 35 U.S.C. 154(b) by 1433 days.

(21) Appl. No.: 14/176,899

(22) Filed: Feb. 10, 2014

(65) Prior Publication Data
US 2014/0150664 A1    Jun. 5, 2014

Related U.S. Application Data

(63) Continuation of application No. 14/009,515, filed as application No. PCT/IB2012/051726 on Apr. 6, 2012.

(30) Foreign Application Priority Data

Apr. 6, 2011 (IT) .................. TO2011A0313

(51) Int. Cl.
| | |
|---|---|
| A47J 31/46 | (2006.01) |
| A47J 31/06 | (2006.01) |
| A47J 31/36 | (2006.01) |

(52) U.S. Cl.
CPC ........... *A47J 31/46* (2013.01); *A47J 31/0647* (2013.01); *A47J 31/36* (2013.01)

(58) Field of Classification Search
CPC ....... H01L 2924/00; H01L 2924/00014; H01L 2224/83801; H01L 2224/8384; H01L 2924/13055; H01L 2924/13091; H01L 21/4878; H01L 21/4882; H01L 2224/32225; H01L 23/055; H01L 23/367; H01L 23/3735; H01L 23/473;
(Continued)

(56) References Cited

U.S. PATENT DOCUMENTS

| | | | | |
|---|---|---|---|---|
| 5,598,764 A | * | 2/1997 | Bambi | ................. A47J 31/002 99/295 |
| 2009/0013875 A1 | * | 1/2009 | Widanagamage Don | .................. A47J 31/36 99/280 |
| 2009/0136639 A1 | * | 5/2009 | Doglioni Majer | ...... A47J 31/36 426/431 |

FOREIGN PATENT DOCUMENTS

| | | |
|---|---|---|
| CN | 1340324 | 3/2002 |
| CN | 1431881 | 7/2003 |
| CN | 1691911 | 11/2005 |

(Continued)

*Primary Examiner* — Tu B Hoang
*Assistant Examiner* — Diallo I Duniver
(74) *Attorney, Agent, or Firm* — Dorsey & Whitney

(57) ABSTRACT

A brewing unit for making espresso (ES) and fresh-brew (FB) coffee, wherein the brewing chamber of a brewing assembly is supplied with water by a constant-frequency pump, and communicates with a first ES coffee outlet conduit, controlled by a calibrated valve, and a second FB coffee outlet conduit via a three-way COV (contact-operated) switch valve, which is formed in a compression piston for closing the brewing chamber, and is designed to be set to a normal open position, in which the first and second outlet conduit and a delivery manifold communicate with one another, and to switch, in use and in opposition to a spring, to a closed position, in which the second outlet conduit is closed, and the first outlet conduit communicates with the delivery manifold.

20 Claims, 4 Drawing Sheets

(58) Field of Classification Search
CPC ...... H01L 24/32; H01L 24/83; A47J 31/0647; A47J 31/36; A47J 31/46; H05K 7/20927
USPC ........ 99/283, 289, 302 P, 302 RR, 280, 281, 99/302 R
See application file for complete search history.

(56) References Cited

FOREIGN PATENT DOCUMENTS

| | | | |
|---|---|---|---|
| CN | 101001555 | 7/2007 | |
| CN | 101119667 | 2/2008 | |
| CN | 101610703 | 12/2009 | |
| WO | WO 2009138856 A2 * | 11/2009 | .......... A47J 31/3609 |

* cited by examiner

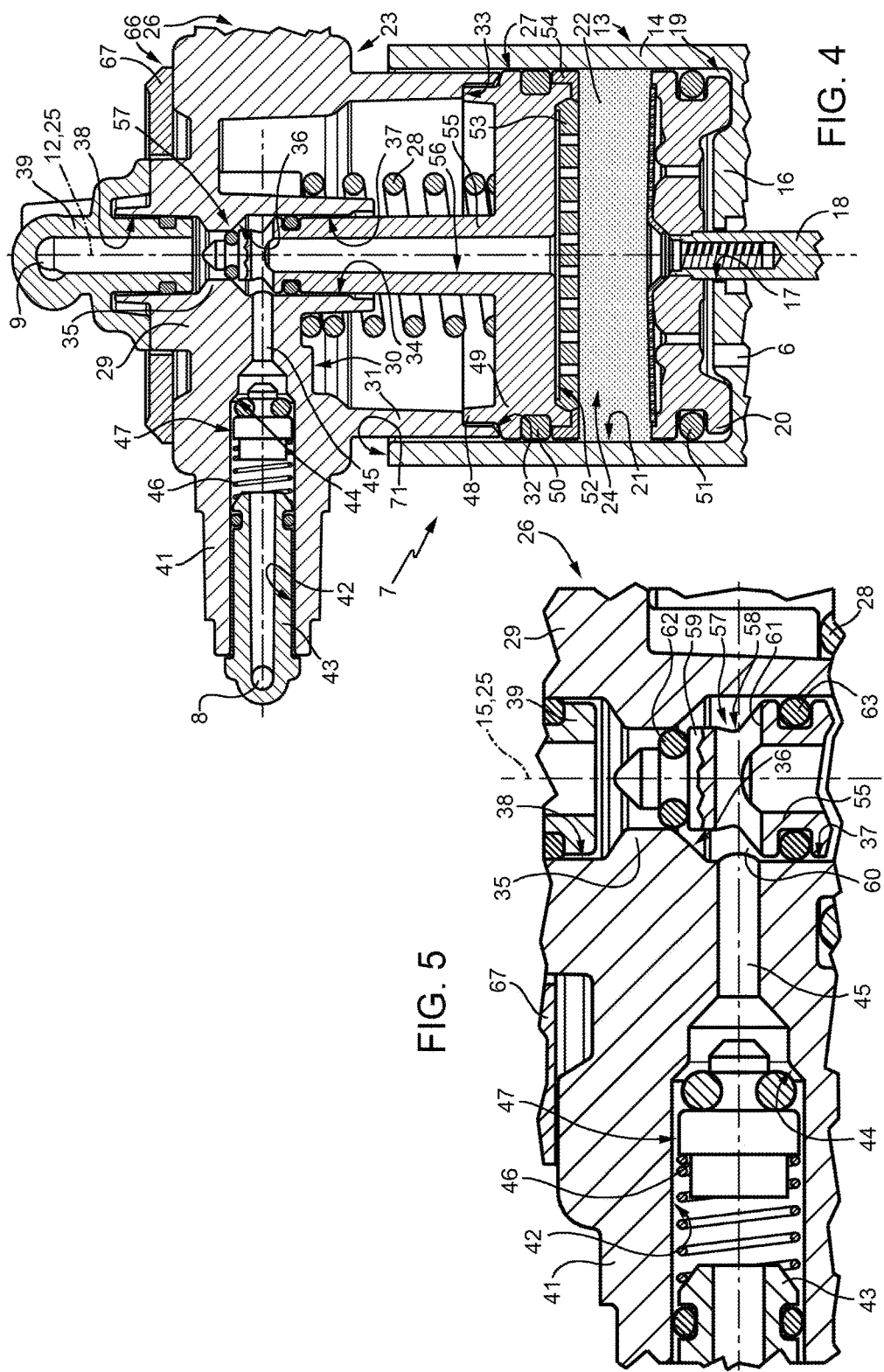

ESPRESSO AND FRESH-BREW COFFEE BREWING UNIT

TECHNICAL FIELD

The present invention relates to an espresso (ES) and fresh-brew (FB) coffee brewing unit.

More specifically, the present invention relates to an ES and FB coffee brewing unit of the type comprising a brewing assembly, and a pump for feeding water to the brewing assembly; the brewing assembly comprising a brewing chamber having and axis and designed to receive a measure of ground coffee; an inlet conduit for a given water supply from the pump; closing means movable along said axis to adjust the volume of the brewing chamber; a first ES coffee outlet conduit; a second FB coffee outlet conduit; and a delivery manifold connecting the brewing chamber to the first and second outlet conduit.

BACKGROUND ART

A brewing unit of this type is known, for example, from EP 1 267 685, and has the drawback of employing an adjustable-flow pump—more specifically, an electromagnetic, adjustable-stroke and/or adjustable-frequency pump, in itself complicated and expensive—in combination with valve means (not easy to produce) for selecting the first or second outlet conduit in response to pressure values generated inside the brewing chamber by the selected pump flow values.

DISCLOSURE OF INVENTION

It is an object of the present invention to provide an ES and FB coffee brewing unit, which is cheap and easy to produce and, at the same time, eliminates the above drawbacks.

It is a further object of the present invention to provide an ES and FB coffee brewing unit designed to improve the brewing unit described in the Applicant's WO 2009 007804.

According to the present invention, there is provided an ES and FB coffee brewing unit as claimed in claim 1 and preferably in any one of the Claims depending directly or indirectly on claim 1.

BRIEF DESCRIPTION OF THE DRAWINGS

A non-limiting embodiment of the present invention will be described by way of example with reference to the accompanying drawings, in which:

FIG. 4 shows the FIG. 2 detail in a second operating position;

FIG. 5 shows the FIG. 3 detail in the FIG. 4 second operating position;

BEST MODE FOR CARRYING OUT THE INVENTION

Figure 1:
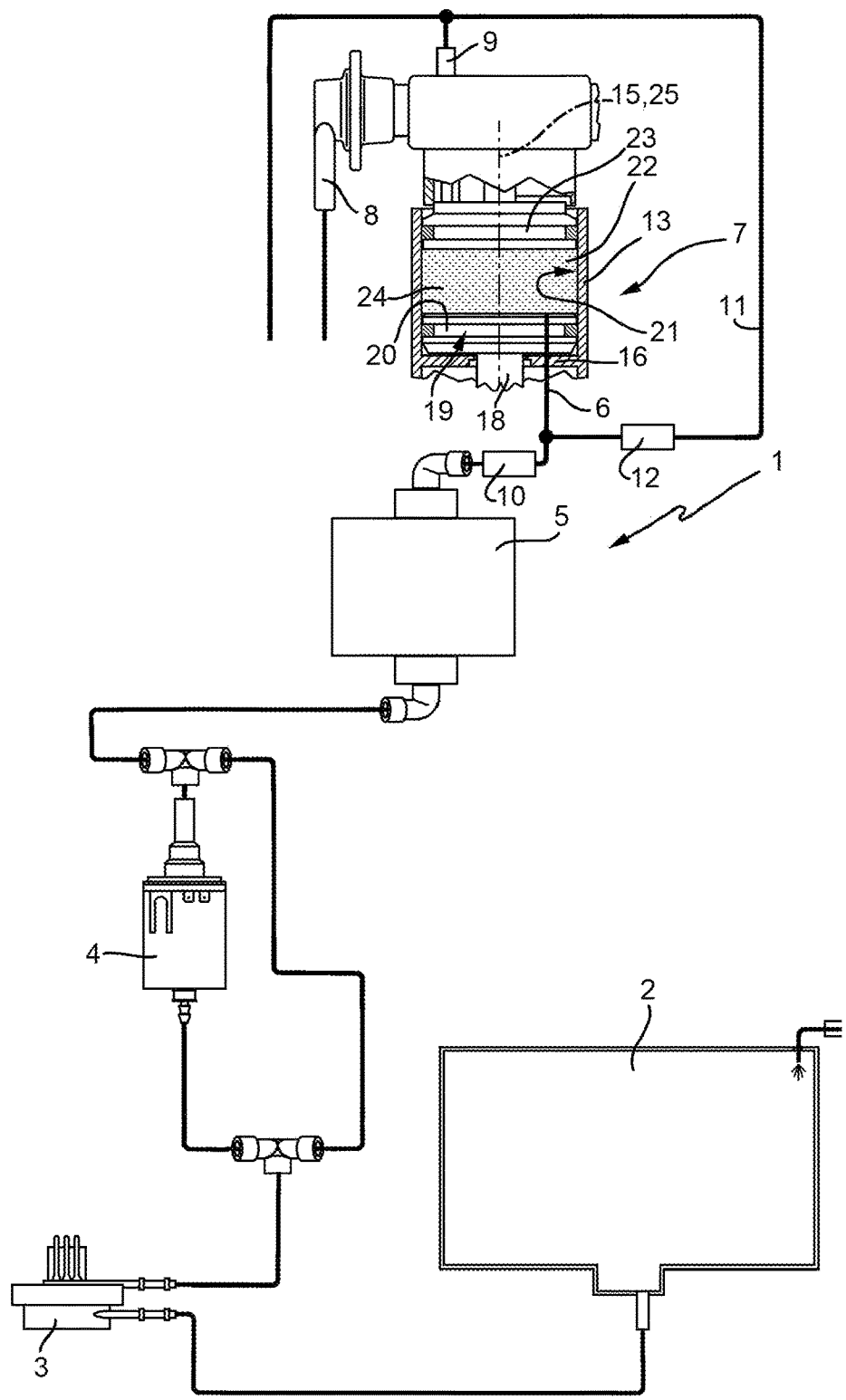
FIG. 1 shows a schematic, with parts removed for clarity, of a preferred embodiment of the brewing unit according to the present invention.

Number 1 in FIG. 1 indicates as a whole a brewing unit for selectively making espresso coffee (hereinafter ES coffee) and fresh-brew coffee (hereinafter FB coffee).

Unit 1 comprises a tank 2 for a given amount of water, the outlet of which is connected via a volume meter 3 to the inlet of a pump 4—preferably an electromagnetic, constant-frequency pump with a fixed maximum stroke—outlet-connected via a boiler 5 to an inlet conduit 6 of a brewing assembly 7 having an ES coffee outlet conduit 8 and FB coffee outlet conduit 9, which are located relatively close to each other, downstream from brewing assembly 7, to dispense the respective coffee beverages from respective spouts (not shown).

Unit 1 comprises a solenoid valve 10 along inlet conduit 6, directly downstream from boiler 5; and a bypass conduit 11 extending through a further solenoid valve 12, and which connects a point along outlet conduit 9 to a point downstream from solenoid valve 10 along inlet conduit 6.

Figure 2:
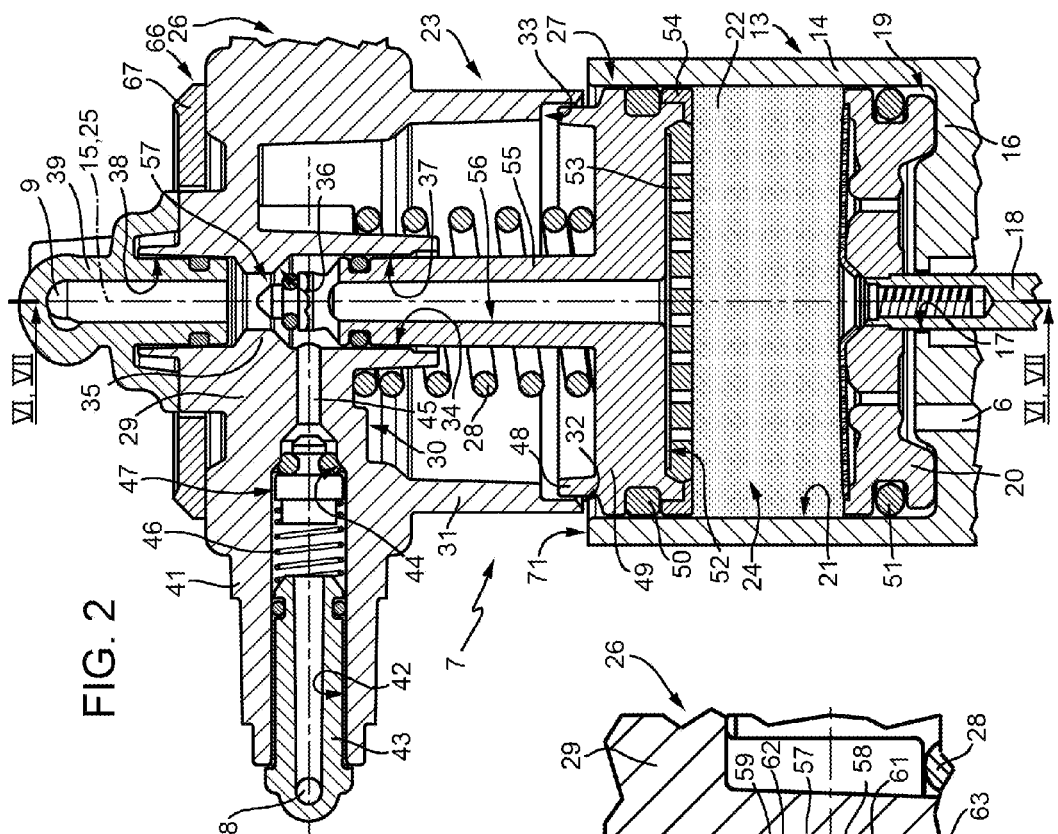
FIG. 2 shows a larger-scale axial section of a detail in FIG. 1 in a first operating position.
Figure 3:
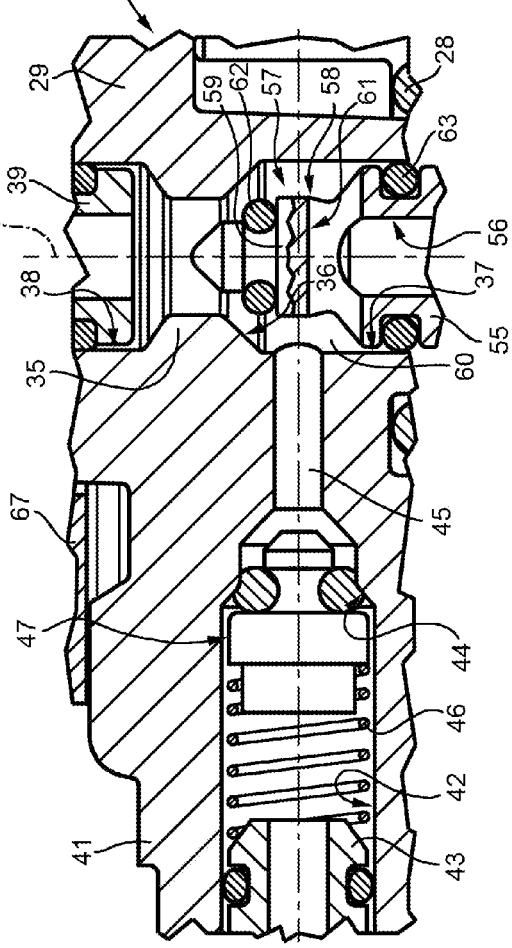
FIG. 3 shows a larger-scale axial section of a detail in FIG. 2.

As shown more clearly in FIGS. 2 and 4, brewing assembly 7 comprises a hollow body—in the example shown, a cup-shaped hollow body 13 having a cylindrical lateral wall 14 with a longitudinal axis 15, and an end wall 16 perpendicular to axis 15 and traversed by inlet conduit 6. End wall 16 has a central through hole 17 coaxial with axis 15 and in which slides the rod 18 of an ejector piston 19, the head 20 of which is perforated axially and slides in fluidtight manner inside a seat 21 defined in hollow body 13 and for housing, on top of head 20, a measure 22 of ground coffee.

Brewing assembly 7 also comprises an axially-sliding compression piston 23 which, in use, is inserted an adjustable distance inside seat 21 to define, in seat 21 and together with ejector piston 19, an adjustable-volume brewing chamber 24 for measure 22.

Compression piston 23 is telescopic with a longitudinal axis 25, which coincides with longitudinal axis 15 when compression piston 23 is inserted inside seat 21 as shown in FIGS. 2 to 7.

Compression piston 23 comprises a main body 26; and a head 27 coaxial with main body 26 and connected telescopically to main body 26 to move, with respect to main body 26 and along axis 25, from a normal extracted position (FIG. 2) to a withdrawn position (FIG. 4) in opposition to a coil spring 28 coaxial with axis 25 and compressed between head 27 and main body 26. When compression piston 23 engages seat 21, the volume of brewing chamber 24, for a given position of compression piston 23, varies according to the position of head 27 (FIGS. 2 and 4) with respect to main body 26.

Main body 26 is cup-shaped, is positioned with its concavity facing head 27, and comprises an end wall 29 crosswise to axis 25 and having an inner surface 30; and a cylindrical lateral wall 31 coaxial with axis 25, of roughly the same but no larger in diameter than seat 21, and having a free edge 32, along the inner periphery of which a groove is formed defining, inside lateral wall 31, an annular shoulder 33 crosswise to axis 25.

An axial through hole 34 is formed, coaxially with axis 25, through end wall 29, and comprises an intermediate inner annular flange 35 bounded, on the side facing head 27, by a truncated-cone-shaped surface 36, and which divides hole 34 into two portions 37 and 38, of which portion 38 is engaged in fluidtight manner by a fitting 39 defining an initial portion of outlet conduit 9.

End wall 29 has another two through holes 40 (FIGS. 6 and 7) for the purpose explained below, and which are parallel to hole 34 and located on diametrically-opposite sides of hole 34, adjacent to the inner surface of lateral wall 31.

End wall 29 has a lateral extension 41, which extends radially with respect to axis 25, in a plane perpendicular to the plane defined by holes 40, and has a through hole 42 extending radially with respect to hole 34 and housing in fluidtight manner a fitting 43 defining an initial portion of outlet conduit 8. At the end facing axis 25, hole 42 is bounded by a truncated-cone-shaped annular seat 44 by which hole 42 communicates with portion 37 of hole 34 via a conduit 45 formed in end wall 29.

The end of fitting 43 inside hole 42 defines an annular retaining shoulder for a calibrated spring 46 of a nonreturn valve 47, which cooperates with annular seat 44 to normally close hole 42, and which only connects hole 34 to outlet conduit 8 when the pressure in conduit 45 exceeds a given value normally ranging between 5 and 9 bars.

Head 27 is cup-shaped, is coaxial with axis 25, is positioned with its concavity facing that of main body 26, and comprises a tubular lateral wall 48 coaxial with axis 25 and closed, on the opposite side to that facing main body 26, by a bottom wall 49. The outer periphery of bottom wall 49 projects outwards of lateral wall 48, has a diameter substantially equal to the outside diameter of lateral wall 31, and has an annular groove housing a seal 50, which engages the inner surface of lateral wall 14 in fluidtight manner. Lateral wall 48 is shaped and sized to slide inside lateral wall 31 of main body 26—parallel to axis 25 and in opposition to spring 28 compressed between end walls 29 and 49—until its free edge comes to rest against annular shoulder 33.

When compression piston 23 is inserted inside seat 21, seal 50 cooperates with the lateral surface of seat 21 to fluidtight seal brewing chamber 24 together with a seal 51 fitted to the periphery of head 20 of ejector piston 19.

The surface of end wall 49 facing ejector piston 19 has a cavity 52 housing a perforated plate 53 secured to end wall 49 by a frame 54.

Head 27 comprises a tubular extension 55 coaxial with axis 25 and having an axial conduit which communicates with cavity 52 via end wall 49, and defines an ES and FB coffee delivery manifold. Tubular extension 55 slides inside portion 37 of hole 34, and cooperates with main body 26 to define a COV (contact-operated) switch valve 57.

Here and hereinafter, the term 'COV' is intended to mean a switch valve fitted to a supporting body and having a moving assembly or switch member, which is movable with respect to the supporting body and only assumes a switched position with respect to the supporting body when it comes into contact with and compresses an external member as a result of relative movement between the supporting body and the external member.

Valve 57 is a three-way slide switch valve for controlling hydraulic connection between delivery manifold 56, conduit 45, and outlet conduit 9, so that delivery manifold 56 communicates with both conduit 45 and outlet conduit 9 when head 27 is in the normal extracted position, and communication between delivery manifold 56 and outlet conduit 9 is cut off when head 27 is in the withdrawn position.

For this purpose, the free end of tubular extension 55 has a tip 58 (FIGS. 3 and 5) designed to engage truncated-cone-shaped surface 36 of inner annular flange 35 of hole 34; and, behind tip 58, a small-section end portion 59, which defines, with the inner surface of portion 37 of hole 34, an annular chamber 60 defining the distribution chamber of three-way valve 57, of which tubular extension 55 forms the switch member, moving assembly or slide, and portion 37 of hole 34 forms the slide face. Annular chamber 60 has an inlet defined by a diametrical hole 61 formed in end portion 59 of tubular extension 55 and connecting annular chamber 60 to brewing chamber 24 via delivery manifold 56; a first radial outlet defined by conduit 45 and connecting annular chamber 60 to outlet conduit 8 via nonreturn valve 47; and a second axial outlet defined by portion 38 of hole 34 and by outlet conduit 9.

At opposite ends of end portion 59 of tubular extension 55, two annular grooves house respective sealing rings 62 and 63, of which sealing ring 62 is interposed between end portion 59 and tip 58, and sealing ring 63 engages the inner surface of portion 37 of hole 34 in fluidtight manner.

Only when head 27 is in the withdrawn position does sealing ring 62 engage truncated-cone-shaped surface 36 of inner annular flange 35 of hole 34 in fluidtight manner to cut off communication between annular chamber 60 and outlet conduit 9.

Figure 6:
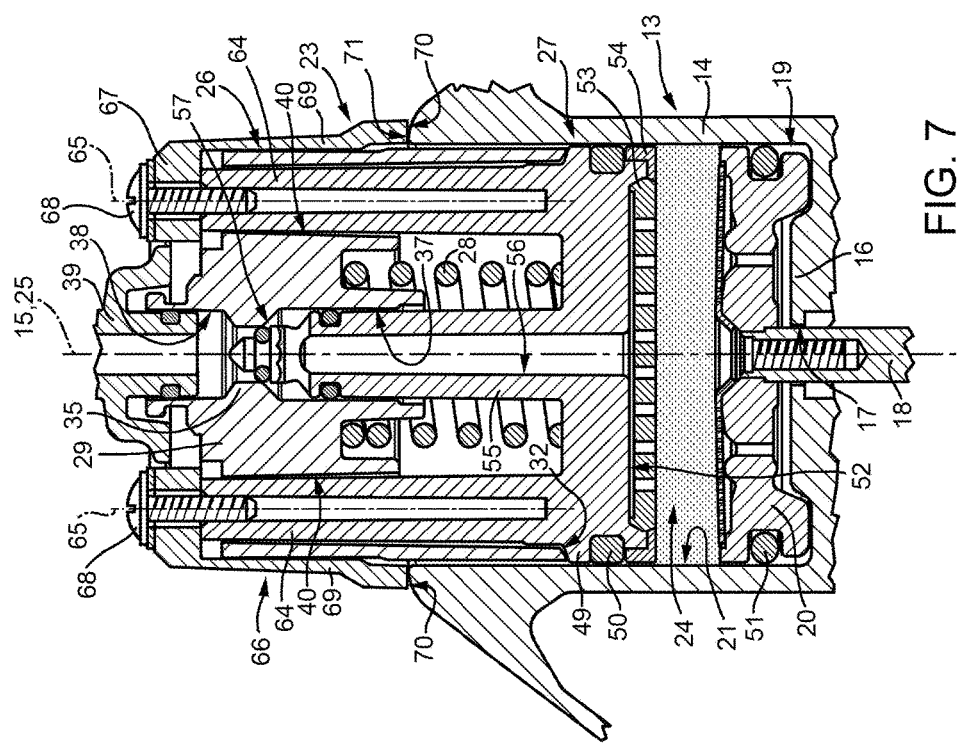
FIGS. 6 and 7 show sections, along lines VI-VI and VII-VII respectively, of the FIG. 2 detail in respective further operating positions.
Figure 7:
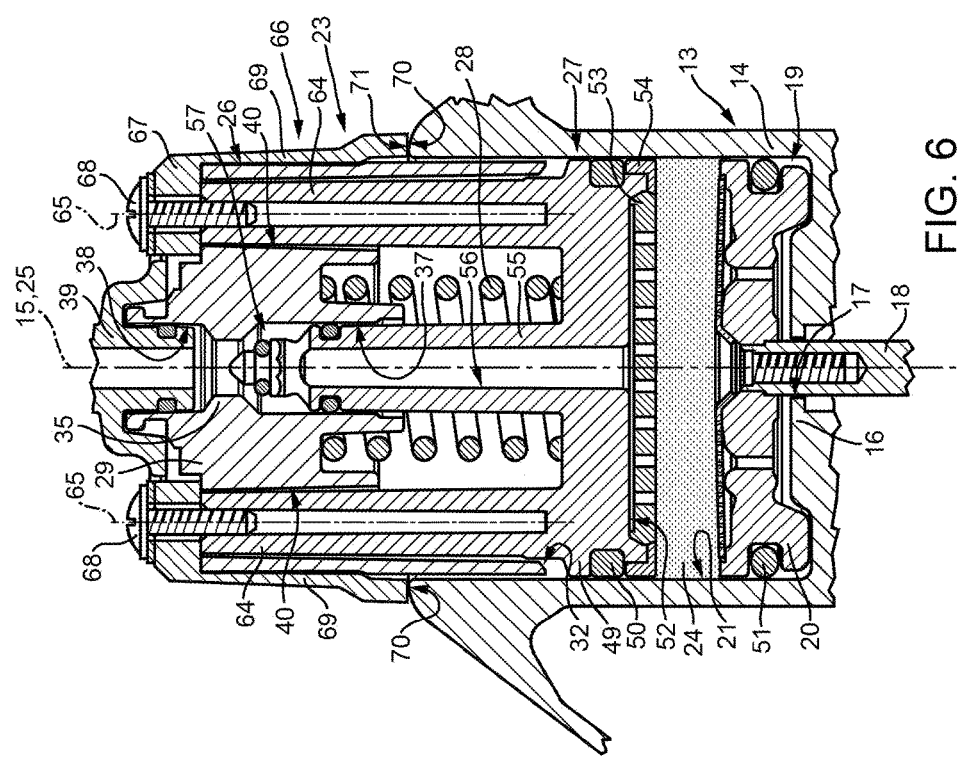

As shown in FIGS. 6 and 7, head 27 comprises two guide rods 64, which extend, parallel to tubular extension 55, from end wall 49, are located on opposite sides of tubular extension 55, have respective axes 65 parallel to axis 25 and lying in a plane defined by axis 25 and the axis of hole 42, and each slide inside the respective through hole 40 in end wall 29 of main body 26 of compression piston 23.

Compression piston 23 comprises a stop and lift device 66, which keeps head 27 connected to main body 26 when head 27 is set by spring 28 to the normal extracted position, and which cooperates with hollow body 13, in particular operating conditions described below, to move head 27 into the withdrawn position.

As shown more clearly in FIGS. 6 and 7, device 66 is defined by a substantially U-shaped body comprising a centre plate 67, which is coaxial with and perpendicular to axis 25, is positioned contacting the outer surface of end wall 29 of main body 26 of compression piston 23, has a central hole for passage of fitting 39, and is fixed to the free ends of rods 64 by through screws 68, which connect plate 67 integrally to head 27 and allow plate 67 to arrest head 27 with the free ends of rods 64 flush with the outer surface of end wall 29 when spring 28 sets head 27 to the extracted position.

The U-shaped body also comprises two wings 69, which extend from diametrically opposite peripheral portions of plate 67, are located on opposite sides of the plane defined by axis 25 and the axis of hole 42, are bent onto the outer surface of lateral wall 31 of main body 26, and, as explained below, are the same length measured along axis 25. Wings 69 have respective curved free edges 70, which are coaxial with axis 25, have the same inner radius as lateral wall 14 of hollow body 13, lie in a plane perpendicular to axis 25, and are positioned directly facing respective portions of a free edge 71 of lateral wall 14.

Brewing unit 1 operates three ways, depending on whether ES coffee, FB coffee, or a flush cycle is selected.
1—Making FB Coffee To make FB coffee (FIGS. 2 and 3), compression piston 23 is set to an initial operating position (not shown) outside seat 21 loaded beforehand with a measure 22, and head 27 is set by spring 28 to the extracted position.

When head 27 is in the extracted position, three-way valve 57 is in the fully-open position, in which annular chamber 60 connects delivery manifold 56 and conduit 45 to each other and to outlet conduit 9. In this position, there being no pressure in delivery manifold 56, nonreturn valve 47 is obviously closed, so delivery manifold 56 only communicates with outlet conduit 9.

Next, compression piston 23 is moved along axis 25 and inserted a distance, which is adjustable on the basis of an electronic control program, inside seat 21 to define a brewing chamber 24 of adjustable volume, normally greater than the volume of measure 22.

In connection with the above, it should be pointed out that, as compression piston 23 is inserted inside seat 21, friction between seal 50 and the inner surface of seat 21 would arrest head 27 with respect to seat 21 and move it, with respect to main body 26, into the withdrawn position, but this movement of head 27 into the withdrawn position is prevented by designing spring 28 to withstand said friction undeformed. In other words, when compression piston 23 stops in the final operating position shown in FIG. 2, head 27 remains in the initial extracted position, and three-way valve 57 remains in the initial fully-open position.

At this point, solenoid valves 10 and 12 are opened and closed respectively, and pump 4 is started to draw a given amount of water, measured continuously by volume meter 3, from the tank, and feed it along inlet conduit 6 to brewing chamber 24. As stated, pump 4 supplies water at a substantially constant flow rate (liters/sec) and at a pressure which varies according to the counterpressure produced in brewing chamber 24 by both the variable hydraulic resistance generated by measure 22 inside brewing chamber 24 and by the swirl induced by measure 22, and the constant hydraulic resistance produced by the shape of delivery manifold 56 and three-way valve 57. Since measure 22, however, is not substantially compressed by compression piston 23, the delivery pressure of pump 4 soon stabilizes at around 0.5-2 bars and, at any rate, at too low a pressure to overcome spring 46, which, as stated, is calibrated to only deform, and so open nonreturn valve 47, under a pressure normally ranging between 5 and 9 bars and normally of 5.5 bars. Nonreturn valve 47 therefore remains closed, and the coffee beverage, in this case FB coffee, flows out of brewing assembly 7 along outlet conduit 9.

When the amount of water for an FB coffee is reached, pump 4 is stopped, and brewing assembly 7 expels all the remaining water from brewing chamber 24.

For this purpose, solenoid valve 10 is closed, and compression piston 23 is advanced further to bring head 27 into contact with measure 22; to compress spring 28 so the free edge of lateral wall 48 of head 27 comes to rest against annular shoulder 33, i.e. head 27 is set to the withdrawn position; and to compress measure 22 so as to 'squeeze' it into a substantially dry tablet.

In this position, three-way valve 57 is in the closed position, in which sealing ring 62 engaging the truncated-cone-shaped surface 36 of annular flange 35 cuts annular chamber 60 off from outlet conduit 9, so delivery manifold 56 communicates solely with conduit 45, and substantially all the water remaining inside brewing chamber 24 is expelled (obviously into the container (not shown) into which the FB coffee has been fed). If, when expelling the remaining water, the pressure in brewing chamber 24 falls below the activating pressure of nonreturn valve 47, thus closing it, solenoid valve 12, which is closed until then, is opened to allow the remaining water to reach outlet conduit 9 along bypass conduit 11.

At this point, compression piston 23 can be extracted from hollow body 13, and the dry tablet formed in seat 21 is expelled by activating ejector piston 19.

When extracting compression piston 23, the friction between seal 50 and the inner surface of seat 21, in this case accompanied by thrust from spring 28, stops head 27 until it is positioned in the extracted position, thus moving three-way valve 57 into the open position. In this position, annular chamber 60 communicates with the outside along outlet conduit 9, which has the advantage, firstly, of drawing any and all liquid inside outlet conduit 9 and conduit 45 back into brewing chamber 24, and, secondly, of connecting brewing chamber 24 to the outside. The outside air drawn into brewing chamber 24 provides for further drying the tablet inside seat 21, and so making it easier to expel by ejector piston 19.

2—Making ES Coffee

To make ES coffee (FIGS. 4 and 5), measure 22 is loaded, brewing chamber 24 is closed by compression piston 23, and solenoid valves 10 and 12 are set in the same way as for making FB coffee, the only difference being that compression piston 23 is advanced to bring head 27 into contact with measure 22; to compress spring 28 so the free edge of lateral wall 48 of head 27 comes to rest against annular shoulder 33, i.e. head 27 is set to the withdrawn position; and to exert a given pressure on measure 22.

In this position, three-way valve 57 is in the closed position, in which sealing ring 62 engaging the truncated-cone-shaped surface 36 of annular flange 35 cuts annular chamber 60 off from outlet conduit 9, so delivery manifold 56 communicates solely with conduit 45.

When pump 4 is activated, brewing chamber 24 is first flooded to impregnate measure 22; and next, the pressure of pump 4—which, up to this point, has remained relatively low and at any rate not high enough to open nonreturn valve 47—rises so as to compress spring 46 and expel the resulting ES coffee along outlet conduit 8.

Once the ES coffee is dispensed, pressurized water supply to brewing chamber 24 is cut off, and, as described for making FB coffee, brewing assembly 7 expels from brewing chamber 24 first all the remaining water, and then the dry tablet formed by 'squeezing' measure 22.

3—Flush Cycle

The flush cycle is performed by operating pump 4 with brewing assembly 7 set as for making FB coffee, but obviously with no measure 22 inside brewing chamber 24.

Since, with this setting, solenoid valve 10 is open, solenoid valve 12 is closed, nonreturn valve 47 is closed, and delivery manifold 56 communicates solely with outlet conduit 9, the water fed by pump 4 into brewing chamber 24 flows straight out along outlet conduit 9, thus flushing outlet conduit 9 and brewing chamber 24.

At this point, compression piston 23 is lowered along brewing chamber 24 past the FIG. 4, i.e. ES coffee-making, position into the FIG. 6, i.e. 'contact', position, in which free edges 70 of wings 69 of stop and lift device 66 are positioned contacting the free edge 71 of lateral wall 14 of hollow body 13.

In connection with the above, it should be pointed out that, when brewing assembly 7 is set to make FB coffee, the distance between free edges 70 and 71 is greater than the travel of head 27 between the withdrawn and extracted positions, so said contact position is never reached during normal operation of brewing unit 1, either in FB or ES mode.

When compression piston 23 reaches the contact position (FIG. 6), head 27, given the absence of measure 22 inside brewing chamber 24, remains in the extracted position, so, even with compression piston 23 in the contact position, water continues to flow out along outlet conduit 9.

At this point, compression piston 23 is lowered further (FIG. 7) along hollow body 13, so stop and lift device 66 moves head 27 into the withdrawn position. In this connection, it should be pointed out that, during this movement, head 27 remains stationary with respect to hollow body 13, and it is main body 26 which moves with respect to head 27 and hollow body 13.

In any case, the movement of head 27 has the effect of cutting delivery manifold 56 off from outlet conduit 9, increasing pressure inside brewing chamber 24, and opening nonreturn valve 47, so that water flows out of, thus flushing, outlet conduit 8.

As the water flows out, the pressure in brewing chamber 24 falls below the activating pressure of nonreturn valve 47, which therefore closes. At this point, the pump is stopped, solenoid valve 10 is closed, and solenoid valve 12, which has been closed up to now, is opened to allow the remaining water, still slightly pressurized inside brewing chamber 24, to flow along bypass conduit 11 to outlet conduit 9, and so flush the bypass conduit.

Flushing bypass conduit 11 may be completed by keeping solenoid valve 10 open, and operating pump 4 with solenoid valve 12 open.

The invention claimed is:

1. A brewing unit for making espresso (ES) coffee and fresh-brew (FB) coffee, the brewing unit comprising:
    a brewing assembly; and
    a pump configured to feed water to the brewing assembly, wherein the pump is a constant-flow pump;
    wherein the brewing assembly includes:
        a variable-volume brewing chamber having an axis, the variable-volume brewing chamber designed to receive a measure of ground coffee;
        an inlet conduit for a given water supply from the pump;
        a compression piston movable along the axis to adjust the volume of the variable-volume brewing chamber, the compression piston being movable in response to instructions from an electronic control program and including a main body and a head movable within the variable-volume brewing chamber, the main body having a distribution chamber, a first through hole, a second through hole, and an annular flange positioned between the distribution chamber and the second through hole;
        a first outlet conduit extending from the first through hole;
        a second outlet conduit extending from the second through hole; and
        a delivery manifold extending through the head into the distribution chamber of the main body of the compression piston and selectively fluidly coupling the variable-volume brewing chamber to the first and second outlet conduits through the distribution chamber; and
    wherein the brewing assembly further includes:
        a nonreturn valve positioned within the first through hole of the main body adjacent to an intermediate conduit and which is opened by a fluid opening pressure ranging between 5 and 9 bars, the intermediate conduit being in fluid communication with the delivery manifold and connecting the distribution chamber to the first through hole; and
        a switch valve configured to keep the delivery manifold in fluid communication with the intermediate conduit, and which is switchable, in opposition to an elastic member positioned between the main body and the head, between:
            a normal open position, in which the elastic member is in an undeformed configuration, the switch valve is not engaged with the annular flange, and the delivery manifold communicates with the second outlet conduit, wherein if the fluid pressure within the brewing assembly is less than the fluid opening pressure, the nonreturn valve in the first through hole remains closed and FB coffee flows past the switch valve into the second through hole and the second outlet conduit to dispense FB coffee through the second outlet conduit; and
            a closed position, in which the elastic member is compressed relative to the undeformed configuration and the switch valve is engaged with the annular flange to prevent fluid communication between the delivery manifold and the second outlet conduit, and the delivery manifold only communicates with the first outlet conduit through the distribution chamber and the intermediate conduit if the fluid pressure within the brewing assembly is greater than the fluid opening pressure such that the nonreturn valve in the first through hole opens and ES coffee flows through the intermediate conduit past the nonreturn valve into the first through hole and the first outlet conduit to dispense EB coffee through the first outlet conduit.

2. The brewing unit as claimed in claim 1, wherein the switch valve includes a three-way contact-operated valve (COV) formed in the compression piston.

3. The brewing unit as claimed in claim 1, wherein:
    the brewing assembly includes a hollow body housing the brewing chamber;
    the head of the compression piston engages the hollow body in sliding and fluidtight manner to define the variable-volume brewing chamber in the hollow body; and
    the volume of the variable-volume brewing chamber varies as a function of a position assumed, in use, by the head of the compression piston along the axis and with respect to the hollow body.

4. The brewing unit as claimed in claim 3, wherein the elastic member extends at least partially around a tubular extension of the compression piston extending from the head into the main body, the delivery manifold extending through the tubular extension.

5. The brewing unit as claimed in claim 3, wherein the elastic member is designed to withstand, undeformed, compression forces generated, in use and by friction, by compression movement of the compression piston along the hollow body.

6. The brewing unit as claimed in claim 1, wherein the head is coaxial with the main body and the axis, is connected in sliding manner to the main body with the interposition of the elastic member, and is movable, with respect to the main body and along the axis, from a normal extracted position corresponding to the normal open position to a withdrawn position corresponding to the closed position, in opposition to the elastic member and by contact pressure exerted on the head contacting the measure of ground coffee.

7. The brewing unit as claimed in claim 6, wherein the head includes a rod substantially parallel to the axis and extending slidably through the main body to guide the head as the head moves with respect to the main body between the extracted and withdrawn positions.

8. The brewing unit as claimed in claim 7, further comprising a stop and a lift device coupled to ends of the rod, outside the main body, to prevent the head from being moved, with respect to the main body and by the elastic member, beyond the extracted position.

9. The brewing unit as claimed in claim 8, wherein the brewing assembly includes a hollow body housing the variable-volume brewing chamber and having a free edge facing the compression piston; and the head is fitted with the stop and lift device located outside the main body and positioned facing the free edge to cooperate with the free edge to move the head into the withdrawn position in response to a given movement of the compression piston along the axis and with respect to the hollow body.

10. The brewing unit as claimed in claim 1, wherein the switch valve includes a slide valve having a slide face formed on the main body, and a moving assembly on the head.

11. The brewing unit as claimed in claim 10, wherein the delivery manifold is formed along the moving assembly.

12. The brewing unit as claimed in claim 10, wherein the slide face is defined by a portion of a third hole formed in the main body and substantially parallel to the axis; and the moving assembly is defined by an extension carried by the head, and which is substantially parallel to the axis and engages the third hole in sliding and fluidtight manner to define the distribution chamber inside the third hole.

13. The brewing unit as claimed in claim 12, wherein the extension and the third hole are coaxial with the axis.

14. The brewing unit as claimed in claim 12, wherein the third hole communicates with the first and second outlet conduits at the distribution chamber.

15. The brewing unit as claimed in claim 14, wherein the distribution chamber is an annular chamber coaxial with the extension; and wherein the first and second outlet conduits extend radially and axially, respectively, with respect to the hole.

16. The brewing unit as claimed in claim 11, wherein the delivery manifold is formed axially along the extension; and a diametrical hole is formed in the extension to connect the delivery manifold to the distribution chamber.

17. The brewing unit as claimed in claim 15, wherein the free end of the extension has a tip, which engages the annular flange in fluidtight manner when the switch valve is in the closed position; the extension having, behind the tip, a small-section end portion, which, together with the slide face, defines the distribution chamber.

18. The brewing unit as claimed in claim 1, wherein:
the brewing assembly includes a calibrated spring positioned between a fitting inside the first through hole and the nonreturn valve;
the calibrated spring is configured to hold the nonreturn valve closed unless the fluid pressure acting on the nonreturn valve exceeds the fluid opening pressure; and
the intermediate conduit is positioned between the distribution chamber and the first through hole.

19. A brewing assembly for making espresso (ES) coffee and fresh-brew (FB) coffee, the brewing assembly comprising:
a variable-volume brewing chamber having an axis, the variable-volume brewing chamber configured to receive a measure of ground coffee;
an inlet conduit for a given water supply from a constant-flow pump;
a compression piston movable along the axis to adjust the volume of the variable-volume brewing chamber in response to instructions from an electronic control program, the compression piston including:
a main body having a distribution chamber, a first through hole, a second through hole, and an annular flange positioned between the distribution chamber and the second through hole;
a head movable within the variable-volume brewing chamber;
a delivery manifold extending through the head into the distribution chamber of the main body of the compression piston and selectively fluidly coupling the variable-volume brewing chamber to the first through hole and the second through hole through the distribution chamber;
a first outlet conduit extending from the first through hole;
a second outlet conduit extending from the second through hole;
a nonreturn valve positioned within the first through hole of the main body adjacent to an intermediate conduit and which is opened by a fluid opening pressure ranging between 5 and 9 bars, the intermediate conduit being in fluid communication with the delivery manifold and connecting the distribution chamber to the first through hole; and
a switch valve positioned within the main body and configured to keep the delivery manifold in fluid communication with the intermediate conduit, and which is switchable, in opposition to an elastic member positioned between the main body and the head, between:
a normal open position, in which the elastic member is in an undeformed configuration, the switch valve is not engaged with the annular flange, and the delivery manifold communicates with the second outlet conduit, wherein if the fluid pressure within the brewing assembly is less than the fluid opening pressure, the nonreturn valve in the first through hole remains closed and FB coffee flows past the switch valve into the second through hole and the second outlet conduit to dispense FB coffee through the second outlet conduit; and
a closed position, in which the elastic member is compressed relative to the undeformed configuration and the switch valve is engaged with the annular flange to prevent fluid communication between the delivery manifold and the second outlet conduit, and the delivery manifold only communicates with the first outlet conduit through the distribution chamber and the intermediate conduit if the fluid pressure within the brewing assembly is greater than the fluid opening pressure such that the nonreturn valve in the first through hole opens and ES coffee flows through the intermediate conduit past the nonreturn valve into the first through hole and the first outlet conduit to dispense ES coffee through the first outlet conduit.

20. The brewing unit as claimed in claim 1, wherein:
in the normal open position, the head of the compression piston is positioned to partially define the variable-volume chamber at a volume that is greater than a volume of the measure of ground coffee; and
in the closed position, the compression piston is advanced to bring the head into contact with measure of ground coffee and compress the elastic member.

* * * * *